US010983348B2

(12) United States Patent
Hwang et al.

(10) Patent No.: US 10,983,348 B2
(45) Date of Patent: Apr. 20, 2021

(54) HEAD MOUNT WEARABLE DEVICE

(71) Applicant: Samsung Electronics Co., Ltd., Suwon-si (KR)

(72) Inventors: Ji-Seong Hwang, Seoul (KR);
Chung-Keun Yoo, Suwon-si (KR);
Kyu-Myeong Kang, Suwon-si (KR);
Kyeong-Soo Kim, Suwon-si (KR);
Jae-Cheon Kim, Suwon-si (KR);
Suk-Jin Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 292 days.

(21) Appl. No.: 16/038,804

(22) Filed: Jul. 18, 2018

(65) Prior Publication Data

US 2019/0064523 A1 Feb. 28, 2019

(30) Foreign Application Priority Data

Aug. 22, 2017 (KR) .................. 10-2017-0106241

(51) Int. Cl.
*G02B 27/01* (2006.01)
*G02B 27/09* (2006.01)

(52) U.S. Cl.
CPC ..... *G02B 27/0172* (2013.01); *G02B 27/0176* (2013.01); *G02B 27/0955* (2013.01); *G02B 2027/014* (2013.01); *G02B 2027/0132* (2013.01)

(58) Field of Classification Search
CPC ........ G02B 27/0172; G02B 2027/0178; G02B 27/0176; G02B 27/0101; G02B 2027/0118; G02B 2027/0138; G02B 27/017; G02B 2027/014; G02B 27/0093; G02B 5/30; G02B 2027/015; G02B 27/01; G02B 27/0149; G02B 2027/0123; G02B 2027/0154; G02B 2027/013; G02B 2027/0127; G02B 2027/0159; G02B 2027/011; G02B 2027/0169; G06F 3/013; G06F 3/017; G06F 1/163; G06F 3/011; (Continued)

(56) References Cited

U.S. PATENT DOCUMENTS

2008/0293271 A1 11/2008 Zhuge
2013/0141360 A1 6/2013 Compton et al.
(Continued)

OTHER PUBLICATIONS

International Search Report dated Nov. 14, 2018 issued in International Application No. PCT/KR2018/008317.

*Primary Examiner* — William R Alexander
*Assistant Examiner* — Sharrief I Broome
(74) *Attorney, Agent, or Firm* — Jefferson IP Law, LLP

(57) ABSTRACT

A head mount wearable device is provided. The housing includes a first surface and a second surface, in which the first surface faces the face of a user and the second surface is opposite to the first surface when a user wears the head mount wearable device, a pair of lenses disposed inside at least one opening formed through the housing from the first surface to the second surface, at least one mounting member connected to the housing and configured to be worn by a user where the pair of lenses are positioned in front of the eyes of a user, and a holder assembly formed on the second surface or close to the second surface to hold a mobile device including a display and holding the mobile device where the display of the mobile device faces the opening.

19 Claims, 16 Drawing Sheets

(58) Field of Classification Search
CPC ...... G06F 3/012; G06F 3/005; G06F 3/03545; G06F 3/04883; G06F 5/10; G06F 1/203; G06F 1/206; G06F 3/016; G06F 3/0317; G06F 3/0362; G06F 3/0412; G06F 1/1632; G06F 3/014; G06F 3/0304; G06F 3/041; G06F 3/045; B60K 35/00; B60K 2370/1529; B60K 2370/66; B60K 2370/67; B60K 37/02; B60K 2370/151; B60K 2370/1531; B60K 2370/154; B60K 2370/155; B60K 2370/174; B60K 2370/177; B60K 2370/178; B60K 2370/186; B60K 2370/1868; B60K 2370/191; B60K 2370/194; B60K 2370/25; B60K 2370/334; B60K 2370/52; B60K 2370/785; G02C 11/10; G02C 2200/08; G02C 5/126; G02C 5/20; G02C 7/16; G02C 1/10; G02C 2200/06; G02C 2202/20; G02C 3/02; G02C 5/143; G02C 5/146; G02C 5/16; G02C 7/04; G02C 7/086; G02C 7/101; G02C 7/102; G02C 7/12; G02C 9/04; H04N 13/344; H04N 5/332; H04N 5/33; H04N 5/64; H04N 9/045; H04N 13/122; H04N 13/194; H04N 13/239; H04N 13/275; H04N 13/279; H04N 13/30; H04N 13/332; H04N 13/349; H04N 1/6083; H04N 2213/003; H04N 5/2252; H04N 5/7491; H04N 9/3135; H04N 9/3147; H04N 9/3155; G09G 3/3208; G09G 2310/0235; G09G 2320/0626; G09G 2340/0471; G09G 2340/0478; G09G 2360/144; G09G 3/2003; G09G 3/3225; G09G 3/3233; G09G 3/36; G09G 2300/0478; G09G 2310/08; G09G 2320/0252; G09G 2320/041; G09G 2320/10; G09G 2340/0407; G09G 3/001; G09G 3/002; G09G 3/18; G09G 3/32

See application file for complete search history.

(56) References Cited

U.S. PATENT DOCUMENTS

| | | |
|---|---|---|
| 2015/0138645 A1 | 5/2015 | Yoo et al. |
| 2015/0198811 A1 | 7/2015 | Hoellwarth |
| 2015/0253574 A1 | 9/2015 | Thurber |
| 2016/0018853 A1 | 1/2016 | Buckley |
| 2016/0062125 A1* | 3/2016 | Baek ................. G06F 1/163 361/679.01 |
| 2017/0094816 A1* | 3/2017 | Yun .................. G02B 27/0176 |
| 2018/0059776 A1* | 3/2018 | Jiang ................. G06F 3/011 |
| 2018/0295733 A1* | 10/2018 | Wen .................. H05K 5/0017 |
| 2019/0159354 A1* | 5/2019 | Zheng ................ A42B 1/24 |
| 2019/0187743 A1* | 6/2019 | Tian .................. G02B 27/0176 |

\* cited by examiner

HEAD MOUNT WEARABLE DEVICE

CROSS-REFERENCE TO RELATED APPLICATION(S)

This application is based on and claims priority under 35 U.S.C. § 119(a) of a Korean patent application number 10-2017-0106241, filed on Aug. 22, 2017, in the Korean Intellectual Property Office, the disclosure of which is incorporated by reference herein in its entirely.

BACKGROUND

The disclosure relates to a head mount wearable device. More particularly, the disclosure relates to a head mount wearable device to which a mobile device is detachably attached.

Recently, various electronic devices that users can wear directly on their body have been developed. Devices designed to be worn on a body can be called wearable devices. For example, wearable devices include a head mount wearable device that is worn on the head of a user, smart glasses, a smart watch or a wristband, a contact lens type device, a ring type device, a shoe type device, a clothing type device or a glove type device, and may have various shapes that can be detachably attached to the body or the clothing of users. Since wearable devices are worn directly on a body, portability and accessibility of a user can be improved.

A head mount wearable device of wearable devices can be provided as a part of a mobile device (e.g., a smartphone) or may be separably combined with a mobile device. A head mount wearable device can provide images using the display of a mobile device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for a head mount wearable device that can be separably combined with a mobile device may include a holder assembly for fixing the mobile device. The holder assembly may be made of an elastic material to be able to cover the mobile device. When a holder assembly made of an elastic material, the elastic holder assembly may be broken due to repeated combination with a mobile device.

A holder assembly of a head mount wearable device may be configured to fix only mobile devices having a specific size, so it may be difficult to mount mobile devices smaller than the specific size.

According to various embodiments of the disclosure, a head mount wearable device on which mobile devices having various sizes can be provided.

In accordance with an aspect of the disclosure, a head mount wearable device is provided The head mount device includes a housing having a first surface and a second surface, in which the first surface faces the face of a user and the second surface is opposite to the first surface when a user wears the head mount wearable device, a pair of lenses disposed inside at least one opening formed through the housing from the first surface to the second surface, at least one mounting member connected to the housing and configured to be worn by a user such that the pair of lenses are positioned in front of the eyes of a user, and a holder assembly formed on the second surface or close to the second surface to hold a mobile device including a display and holding the mobile device 10 such that the display of the mobile device faces the opening. The holder assembly is positioned not to close the opening and may include a mechanical button disposed on the second surface to be pressed down when the mobile device is held by the holder assembly, a first member sliding on the second surface in a first direction from a first position to a second position in which the first position is closer to the opening than the second position when seen from above the second surface a second member connected to the first member, being able to rotate about a shaft extending in a second direction perpendicular to the first direction, and forming a recess in cooperation with the first member to receive a portion of the mobile device, and a first biasing member moving the first member in the first direction when the button is pressed down, and configured such that the second member is close to the second surface.

In accordance with another aspect of the disclosure, a head mount wearable device is provided. The head mount device includes a housing having a space in which at least one lens is disposed and a mobile device is mounted, a connector assembly rotatably connected to the housing and electrically connected to the mobile device, and a holder assembly included in the housing and configured to slide when a button on the housing is pressed down, to cover a portion of the mobile device, in which the holder assembly may include a body combined with the housing, a first member configured to slide on the body, a first biasing member disposed between the body and the first member and providing elasticity to the first member, a second member rotatably connected to the first member to cover a portion of the mobile device, locking members configured to lock or unlock the second member to or from the body, a button configured to unlock the locking members by being pressed and rotated by the mobile device, and a second biasing member configured to prevent the button from protruding out of the housing.

In accordance with another aspect of the disclosure, a holder assembly of a head mount wearable device is provided. The holder assembly includes a mechanical button, a first member configured to slide on a surface of the head mount wearable device in a first direction from a first position to a second position, in which the first position is closer to the opening than the second position when seen from above the first surface, a second member connected to the first member, being rotatable about a shaft extending in a second direction perpendicular to the first direction, and forming a recess in cooperation with the first member to receive a portion of the mobile device, and a first biasing member configured to move the first member in the first direction when the button is pressed down, and configured such that the second member is close to the second surface.

In accordance with another aspect of the disclosure, a head mount wearable device is provided. The head mount device includes a housing having a space in which at least one lens is disposed and a mobile device is mounted, a connector assembly rotatably connected to the housing and electrically connected to the mobile device, and a holder assembly configured to slide when a button on the housing is pressed down, to cover a portion of the mobile device.

According to a head mount wearable device of various embodiments of the disclosure, as the holder assembly is slid by a button that is pressed down by a mobile device, the wearable device can be detachably coupled to mobile devices having various sizes.

Other aspects, advantages, and salient features of the disclosure will become apparent to those skilled in the art from the following detailed description, which, taken in conjunction with the annexed drawing, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Through the drawings, like reference numerals will be understood to refer to like parts, components, and structures.

DETAILED DESCRIPTION

Figure 1:
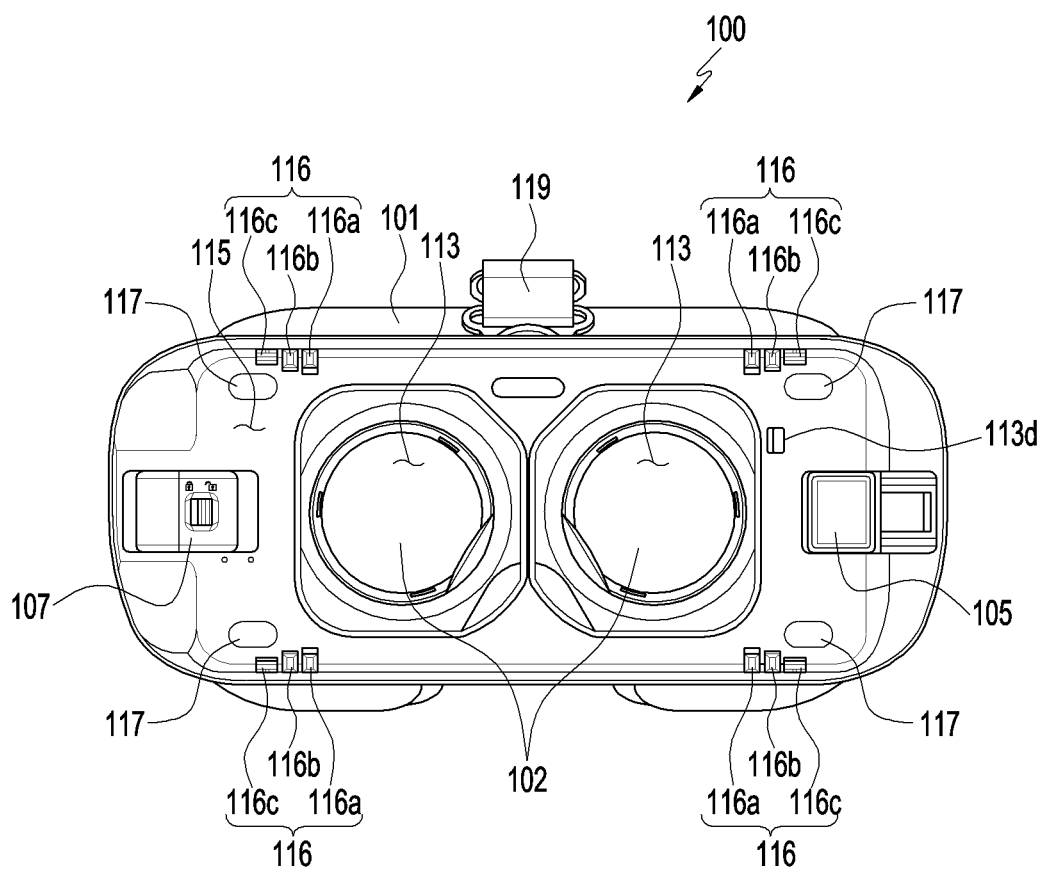
FIG. 1 is a front view illustrating a head mount wearable device according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for the illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. For example, the module may be implemented by an application-specific integrated circuit (ASIC).

Various embodiments as described herein may be implemented by software (e.g., program) including an instruction stored in machine-readable storage media (e.g., internal memory or external memory). The machine is a device that calls the stored instruction from the storage media and can operate according to the called instruction, and may include an electronic device (e.g., electronic device) according to the disclosed embodiments. The instruction, when executed by a processor (e.g., processor), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

A method according to various embodiments disclosed herein may be included in a computer program product. The computer program product may be traded between a seller and a purchaser as an item. The computer program product may be distributed in the type of a device-readable storage medium (e.g., a compact disc read only memory (CD-ROM) or through an application store (e.g., Play Store™) on the web. When the computer program product is distributed on the web, at least a portion of the computer program product may be at least temporarily stored or created in a storage medium, such as the memory of the server of the manufacturer, the server of an application store, or a relay server.

Certain aspects of the disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the disclosure can be easily construed by programmers skilled in the art to which the disclosure pertains.

At this point it should be noted that the various embodiments of the disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the disclosure as described above. Alternatively, one or more processors operating in accordance with stored instructions may implement the functions associated with the various embodiments of the disclosure as described above. If such is the case, it is within the scope of the disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the disclosure can be easily construed by programmers skilled in the art to which the present pertains.

Components (e.g., a module or a program) according to various embodiments may be single units or may include various elements, and some of corresponding sub-components may be omitted or other sub-components may be further included in various embodiments. Generally or additionally, some components (e.g., a module or a program) may be integrated in a single unit and perform similarly or in the same way the functions of the components before they are integrated. Operations that are performed by modules, program modules, or other components according to various embodiments may be performed sequentially, in parallel, repeatedly, or heuristically, or at least some operation may be performed in another order or omitted, or other operations may be added.

FIG. 1 is a front view illustrating a head mount wearable device according to various embodiments of the disclosure.

Referring to FIG. 1, a head mount wearable device 100 according to various embodiments may include a housing 101, a mounting member 119, a connector assembly 107, and a holder assembly 105.

According to an embodiment of the disclosure, the housing 101 can be worn on a portion of the head of a user. According to an embodiment of the disclosure, the housing 101 may be made of resin. The housing 101 is not limited to resin and may be made of various materials that are rigid and light for comfortable fit for users. According to an embodiment of the disclosure, the housing 101 may have a first surface, a second surface, and at least one opening 113. The first surface may face the user's face when the wearable device 100 is mounted on the user. The first surface may be curved to correspond to the user's face. The first surface may have a face seat (not shown) that is brought in contact with a portion of the user's face. The face seat may be made of an elastic material. For example, the face seat may be formed like a cushion, such as a sponge. The face seat is formed like a cushion, so it can provide a comfortable fit when it is brought in contact with the user's face. According to an embodiment of the disclosure, the second surface may be opposite to the first surface. According to an embodiment of the disclosure, the opening 113 may be formed through the housing from the first surface to the second surface. According to an embodiment of the disclosure, a pair of lenses 102 may be disposed inside the opening 113. The positions of the pair of lenses 102 may correspond to the positions of the eyes of a user when the user wears the wearable device.

According to an embodiment of the disclosure, a third opening 113 exposing a portion of a button 157 may be formed inside the space 115. According to an embodiment of the disclosure, the space 115 receiving a mobile device (e.g., the mobile device 10 of FIG. 10 to be described below) may be formed by the second surface of the housing 101. Retainers 116 that are brought in contact with the sides of the mobile device 10 may be formed on the sides of the space 115. The retainers 116 each may include a first retainer 116a, a second retainer 116b, and a third retainer 116c. The first, second, and third retainers 116a, 116b, and 116c may be configured to be protruded or received from or in the housing 101. The first retainers 116a may protrude from the side of the space 115 further than the second retainers 116b. The second retainers 116b may protrude from the side of the space 115 further than the third retainers 116c. For example, when a mobile device 10 having a first size is received in the space 115, the first retainers 116a can hold and support the sides of the mobile device 10. When a mobile device 10 having a second size larger than the first size is received in the space 115, the second retainers 116b can hold and support the sides of the mobile device 10. The second retainers 116b may be pressed by the mobile device 10 having the second size and received in the housing 101. When a mobile device 10 having a third size larger than the second size is received in the space 115, the third retainers 116c can hold and support the sides of the mobile device 10. The second retainers 116b and the third retainers 116c may be pressed by the mobile device 10 and received in the housing 101. The retainers 116a, 116b, and 116c can prevent shaking of mobile devices 10 having various sizes (a first size, a second size, and a third size) from shaking by holding the sides of the mobile devices 10.

According to an embodiment of the disclosure, the retainers 116a, 116b, and 116c can a shock from being applied to the mobile devices 10 or the housing 101 when the mobile devices 10 are fit into the space 115 of the mobile device 10 by holding portions of the sides of the mobile devices 10. According to an embodiment of the disclosure, the retainers 116 can align the mobile devices 10 in the space 115 or prevent the mobile devices 10 from being inclined in the space 115 by holding portions of the sides of the mobile devices 10. According to an embodiment of the disclosure, display protectors 117 may be disposed on the inner side of the space 115. The display protectors 117 may protrude from the inner side. According to an embodiment of the disclosure, the display protectors 117 may be made of an elastic material. When the display of a mobile device 10 is fit into space 115 toward the inner side of the space 115, the display protectors 117 can come in contact with the display of the mobile device 10. Since the display protectors 117 come in contact with the display of the mobile device 10, the entire display of the mobile device 10 can be prevented from coming in contact with the entire inner side of the space 115.

According to an embodiment of the disclosure, the mounting member 119 is connected to the housing 101 for a user to be able to wear the housing 101. For example, the mounting member 119 may be formed in a band type that covers the head of a user. The mounting member 119 may include a band part (not shown) and a stretcher (not shown). The stretcher allows for adjusting the length of the band to fit the heads of various users. The band part may be formed in various types, such as a strap, temples, a helmet, or the like.

According to an embodiment of the disclosure, the connector assembly 107 may be disposed on the second surface of the housing 101 or may be positioned close to the second surface. The connector assembly 107 may be rotatably coupled to the housing 101. The connector assembly 107 can be connected to the connector of the mobile device 10 (e.g., the connector 11 of the mobile device of FIG. 10) when the mobile device 10 is mounted on the wearable device 100. The wearable device 100 can provide an electrical signal to the mobile device 10 through the connector assembly 107 and the connector 11 of the mobile device.

According to an embodiment of the disclosure, the opening 113 may be positioned between the holder assembly 105 and the connector assembly 107. For example, the holder assembly 105 may be positioned in a predetermined area at the left side of the opening 113 on the housing 101 and the connector assembly 107 may be positioned in another predetermined area at the right side of the opening 113 on the housing 101. According to an embodiment of the disclosure, the holder assembly 105 may be disposed on the second surface of the housing 101 or on a side of the housing 101 close to the second surface. The holder assembly 105 may hold a portion of the mobile device 10 to keep the mobile device 10 in the space. For example, the holder assembly 105 can hold a portion of the mobile device 10 and the connector assembly 107 can hold another portion of the mobile device 10. The holder assembly 105 will be described below with reference to the drawings.

Figure 2:
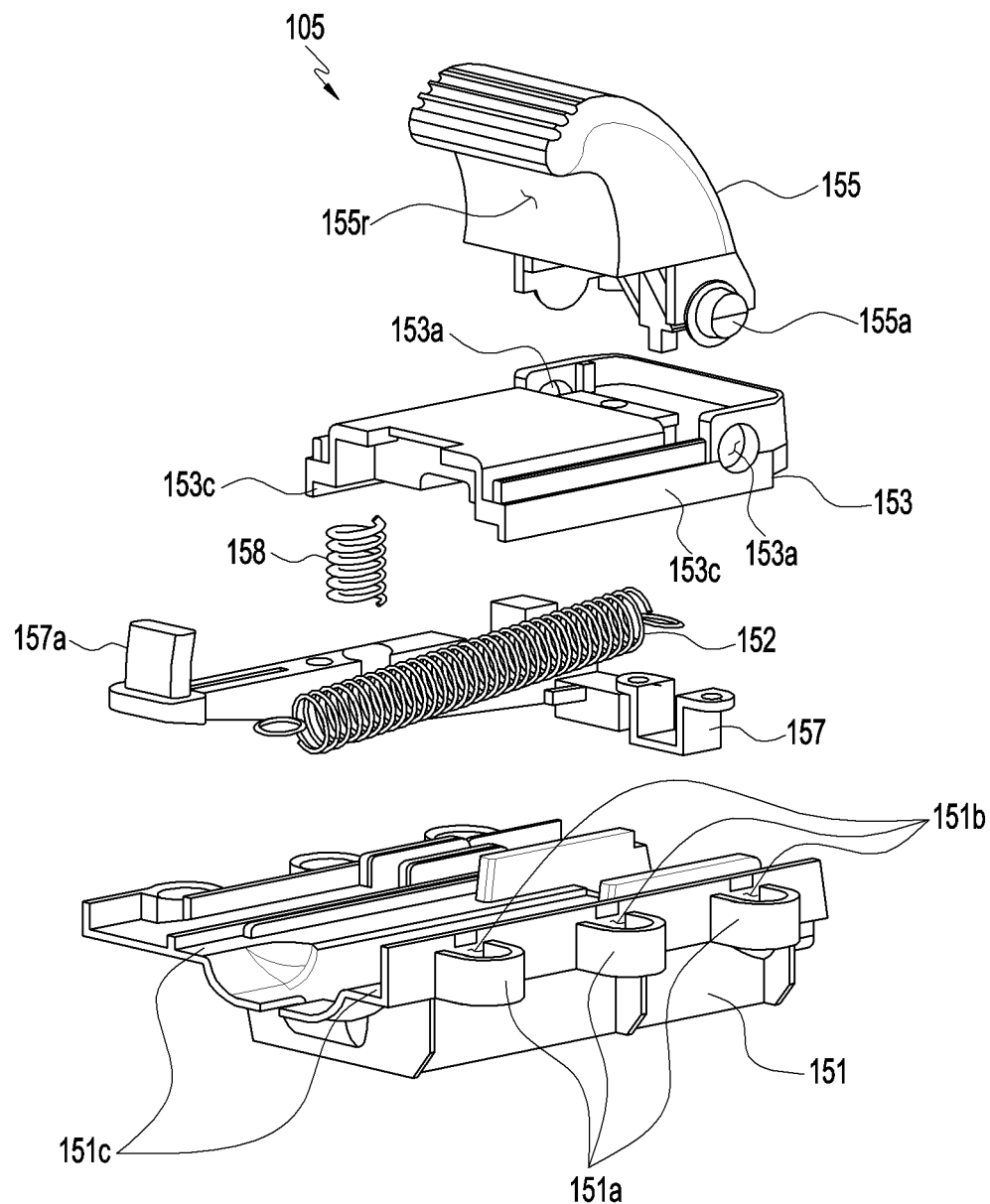
FIG. 2 is an exploded perspective view illustrating a holder assembly of a head mount wearable device according to various embodiments of the disclosure.

FIG. 2 is an exploded perspective view illustrating a holder assembly of a head mount wearable device according to various embodiments of the disclosure.

Referring to FIG. 2, the holder assembly 105 according to various embodiments may include a body 151, a first member 153, a second member 155, and a first biasing member 152 or a second biasing member 158.

According to an embodiment of the disclosure, the body 151 may be disposed in the housing (e.g., the housing 101 of FIG. 1). The body 151 may have flanges 151a each having first fastening holes 151b and second fastening holes (not shown) corresponding to the first fastening holes 151a may be formed in the housing 101. Bolts (not shown) are inserted in the first fastening holes 151b and the second fastening holes, so the body 151 can be combined with the housing 101.

According to an embodiment of the disclosure, the first member 153 can slide on the body 151. According to an embodiment of the disclosure, first guides 153c may be formed on the bottom of the first member 153 and second guides 151c corresponding to the first guides 153c may be formed on the top of the body 151. The first guides 153c of the first member 153 can slide along the second guides 151c of the body 151.

According to an embodiment of the disclosure, the second member 155 may be rotatably coupled to the first member 153. Rotational portions 153a may be formed at the first member 153. The rotational portions 153a are formed like holes. According to an embodiment of the disclosure, the rotational portions 153a are not limited to the holes and may be formed like grooves. The second member 155 may have a shaft 155a inserted in the rotational portions 153a. The shaft 155a may extend and protrude from sides of the second member 155. Since the shaft 155a is inserted in the rotational portions 153a, the second member 155 can be rotatably coupled to the first member 153. According to an embodiment of the disclosure, the first member 153 may form a recess 155c for receiving a portion of a mobile device in cooperation with the second member 155.

According to an embodiment of the disclosure, the first biasing member 152 can connect the body 151 and the first member 153 to each other. The first biasing member 152 may have elasticity. For example, the first biasing member 152 may be a spring. The first biasing member 152 may be coupled to the body 151 at an end and to the first member 153 at the other end. The first biasing member 152 can provide elasticity to the first member 153 and can slide the first member 153 on the body 151.

According to an embodiment of the disclosure, the second biasing member 158 may be disposed between the button 157 and the inner side of the housing (e.g., the housing 101 of FIG. 1). The second biasing member 158 can press the button 157.

Figure 3:
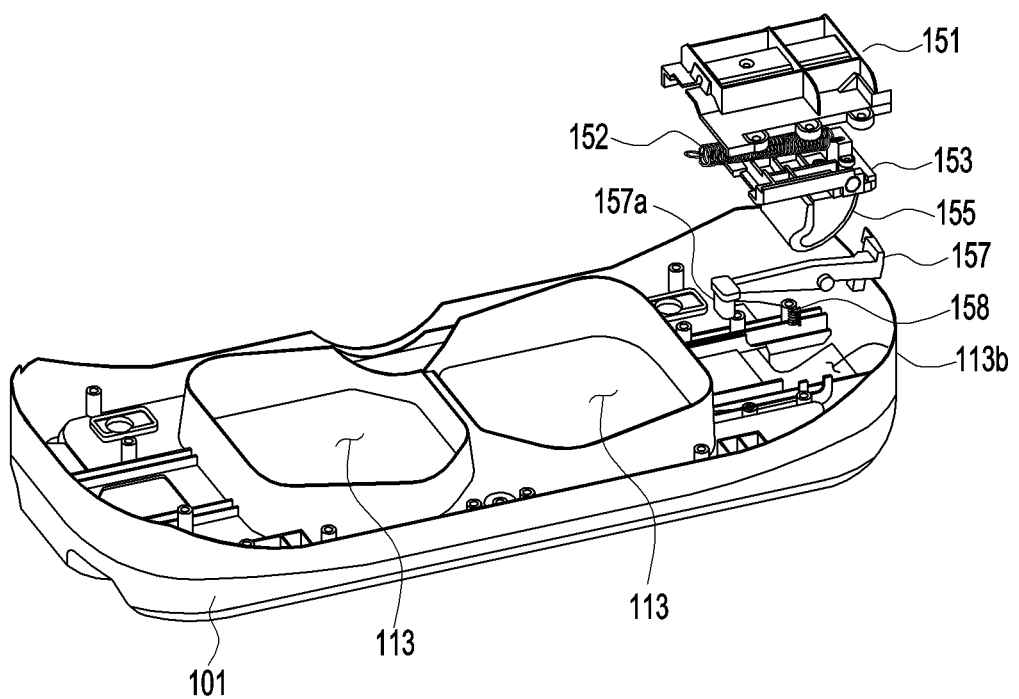
FIG. 3 is a perspective view before a holder assembly and a housing are combined in a head mount wearable device according to various embodiments of the disclosure.

FIG. 3 is a perspective view before a holder assembly of a head mount wearable device according to various embodiments of the disclosure.

Referring to FIG. 3, the housing 101 may have a second opening 113b formed close to the opening 113. The second member 155 can be exposed outside the housing 101 through the second opening 113b.

According to an embodiment of the disclosure, the button 157 may be arranged in parallel with the body 151. A protrusion 157a of the button 157 can be exposed outside the housing 101 through a third opening (e.g., the third opening 113d of FIG. 1) formed through the second surface of the housing 101.

Figure 4:
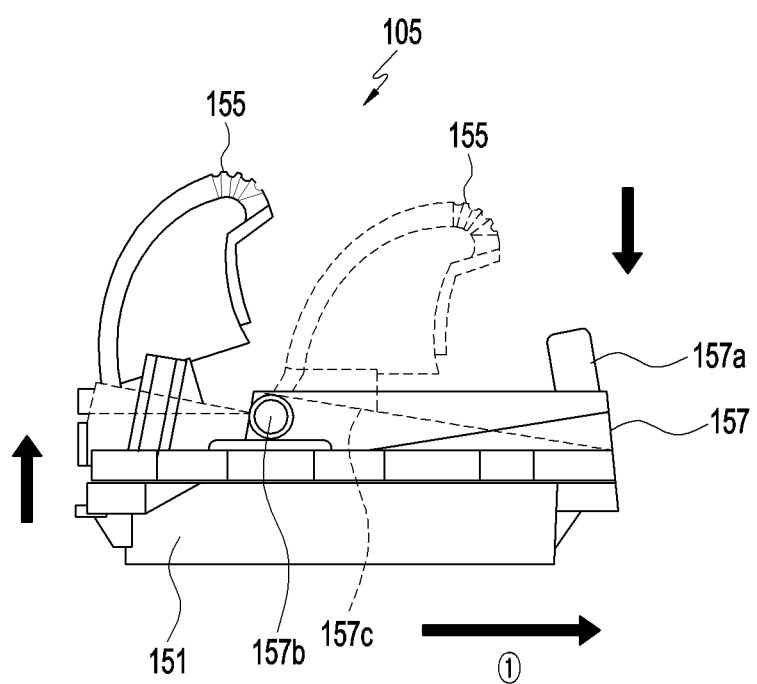
FIG. 4 is a side view illustrating a rotation a lever of a holder assembly of a head mount wearable device according to various embodiments of the disclosure.

FIG. 4 is a side view illustrating a rotation of a button of holder assembly in a head mount wearable device according to various embodiments of the disclosure.

Referring to FIG. 4, the button 157 may have a lever 157c, a protrusion 157a, and a second shaft 157b. The lever 157c may have a longitudinal direction and may be arranged in parallel with the body 151. According to an embodiment the protrusion 157a may perpendicularly extend from an end of the lever 157c. According to an embodiment of the disclosure, the second shaft 157b may extend from the lever 157c and may be rotatably coupled to the body 151.

According to an embodiment of the disclosure, when the protrusion 157a is pressed down by an external force, the lever 157c can be rotated about the second shaft 157b. For example, the other end of the lever 157c can moved in the opposite direction to the protrusion 157a pressed down.

Figure 5:
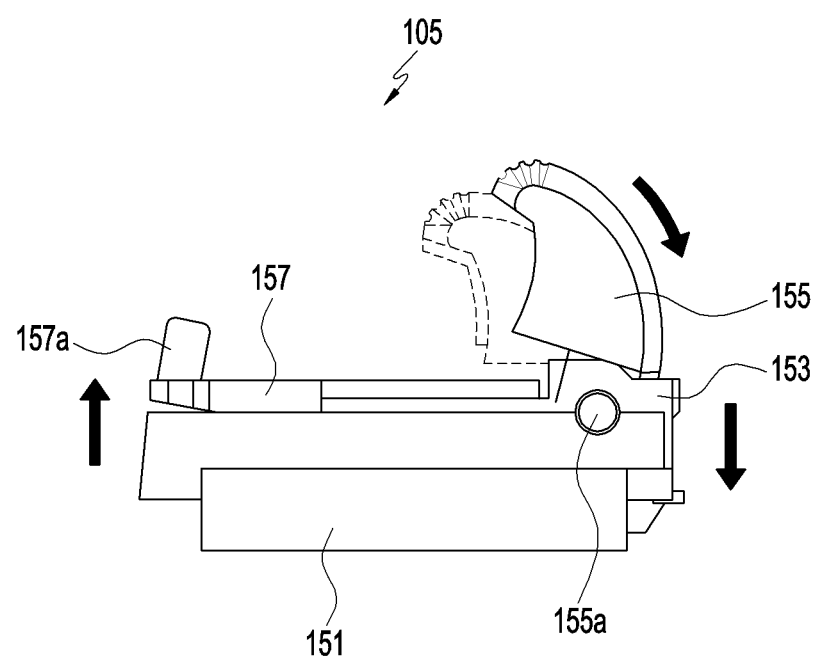
FIG. 5 is a side view illustrating a rotation a second member of a holder assembly of a head mount wearable device according to various embodiments of the disclosure.

FIG. 5 is a side view illustrating a rotation of a second member of a holder assembly in a head mount wearable device according to various embodiments of the disclosure.

Figure 10:
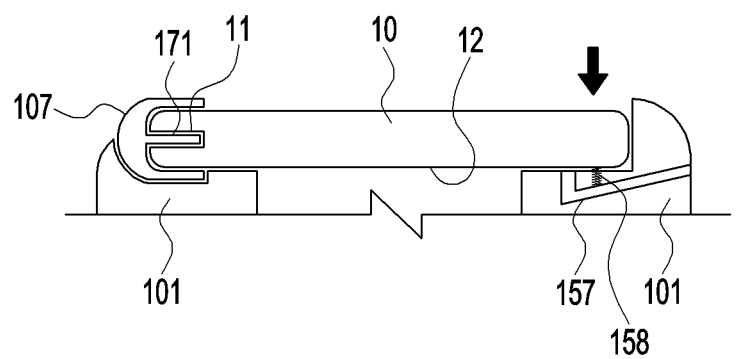
FIG. 10 is a cross-sectional view when a mobile device is disposed in a space of a head mount wearable device according to various embodiments of the disclosure.

Referring to FIG. 5, the second member 155 may have a shaft 155a. The shaft 155a may be inserted in the rotational portions (e.g., the rotational portions 153a of FIG. 2) of the first member 153. The second member 155 can be rotated about the shaft 155a. The second member 155 can be rotated away from the second surface of the housing 101. According to an embodiment of the disclosure, the second member 155 is rotated toward the second surface of the housing 101, when a mobile device (e.g., the mobile device 10) of FIG. 10 is mounted into the space, the second member 155 can cover a portion of the mobile device 10.

Figure 6A:
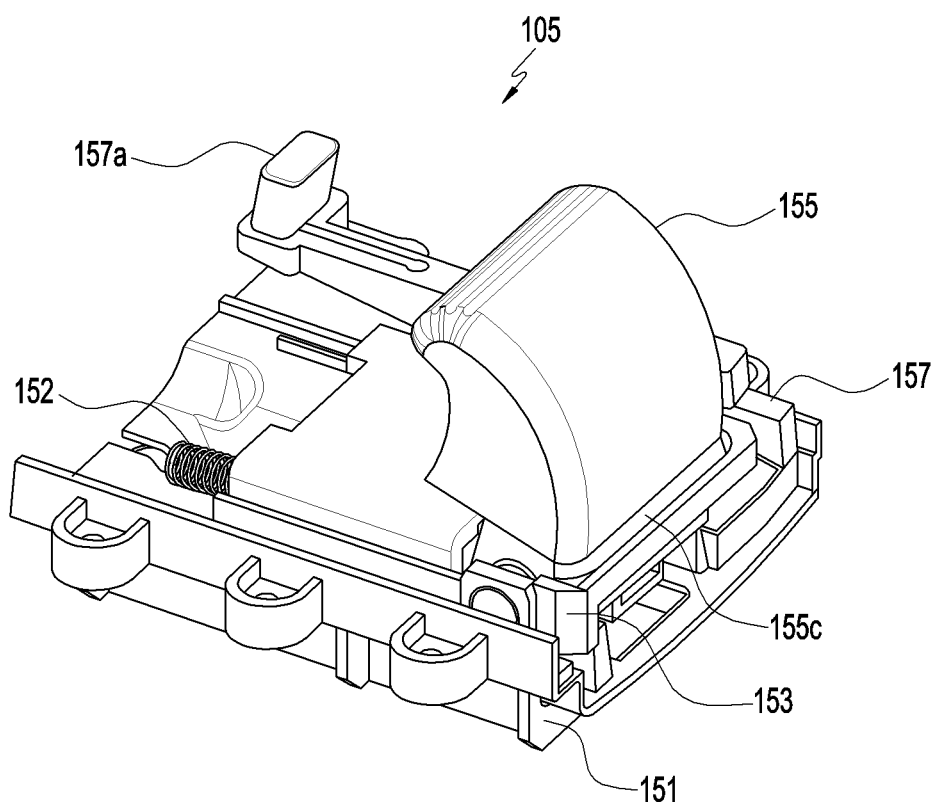
FIG. 6A is a perspective view before a holder assembly slides a head mount wearable device according to various embodiments of the disclosure.

FIG. 6A is a perspective view before a holder assembly of a head mount wearable device according to various embodiments slides.

Figure 6B:
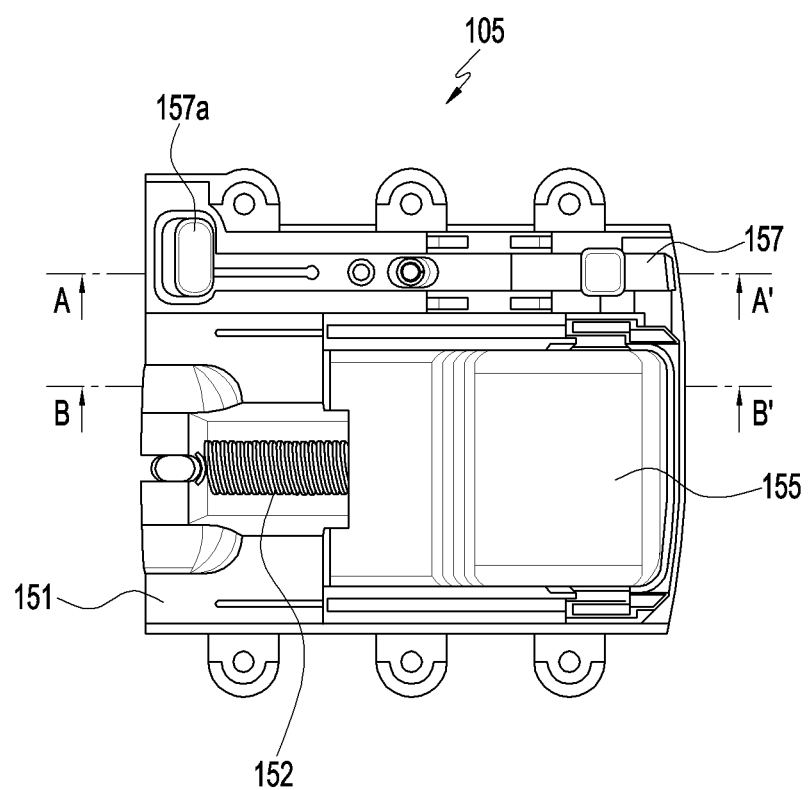
FIG. 6B is a front view before a holder assembly slides in a head mount wearable device according to various embodiments of the disclosure.

FIG. 6B is a front view before a holder assembly slides a head mount wearable device according to various embodiments.

Figure 6C:
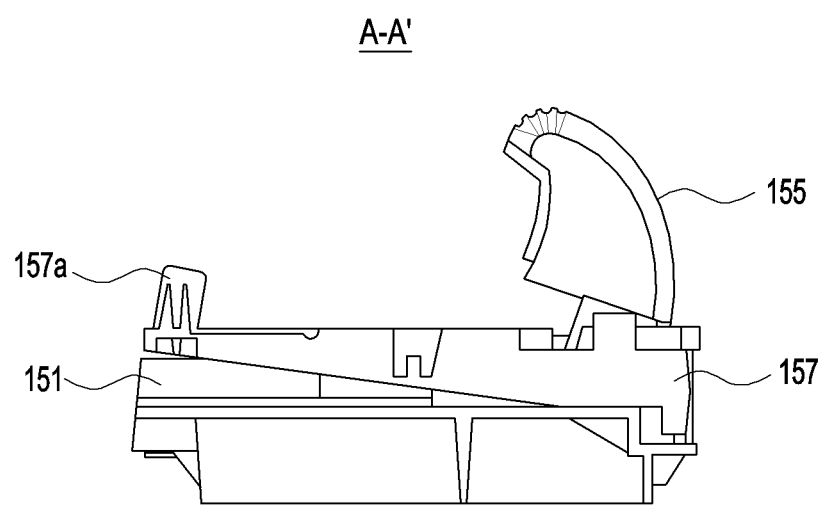
FIG. 6C is a cross-sectional view taken along line A-A' of FIG. 6B according to various embodiments of the disclosure.

FIG. 6C is a cross-sectional view taken along line A-A' of FIG. 6B according to various embodiments.

Figure 6D:
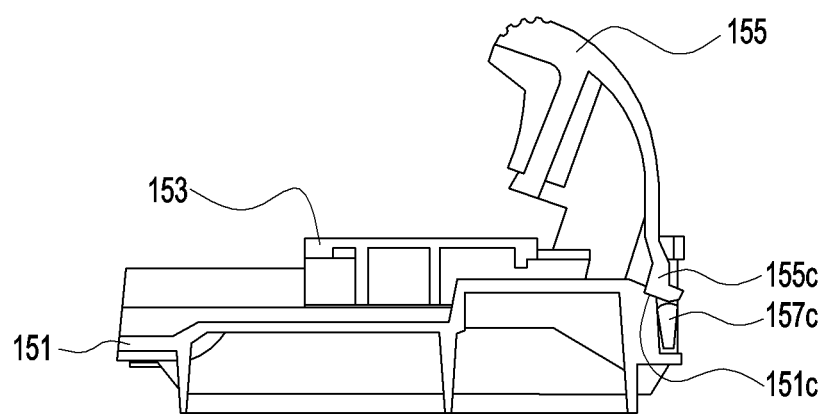
FIG. 6D is a cross-sectional view taken along line B-B' of FIG. 6B according to various embodiments of the disclosure.

FIG. 6D is a cross-sectional view taken along line B-B' of FIG. 6B according to various embodiments.

Referring to FIGS. 6A to 6D, the holder assembly 105 may include locking members 151c and 155c that lock or unlock the second member 153 to or from the body 151. The locking members 151c and 155c may have a first locking portion 151c and a second locking portion 155c. The first locking portion 151c is formed at the body 151 and may have a groove shape. The second locking portion 155c is formed at the second member 155 and can be locked or unlocked to or from the first locking portion 151c. The second locking portion1 155c may have a protrusion shape corresponding to the groove shape of the first locking portion 151c. The second locking member 155 can be locked to the first locking portion 151c by rotating about the first member 153. When the second locking member 155c is locked to the first locking portion 151c, the first member 153 connected to the second member 155 can be prevented from sliding due to the elasticity of the first biasing member 152.

According to an embodiment of the disclosure, the other end of 157c of the button 157 may come in contact with the second locking portion 155c. For example, the second locking portion 155c can press the other end 157c of the button by being locked to the first locking portion 151c. As the other end 157c of the button is pressed by the second locking portion 155c, the button 155 can be rotated about the second shaft (the second shaft 157b of FIG. 4). As the button 155 is rotated, the protrusion 157a of the button can be moved in the opposite direction to the pressing direction of the other end 157c of the button 157. For example, the protrusion 157a of the button may protrude into the space (e.g., the space 115 of FIG. 1) of the housing 101.

Figure 7A:
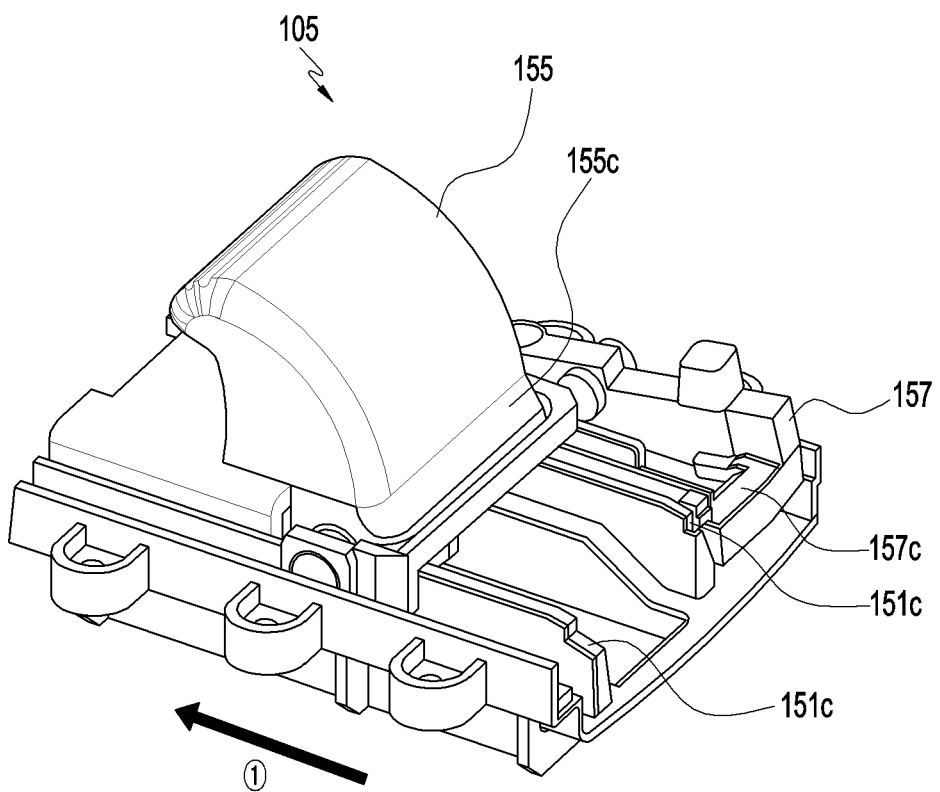
FIG. 7A is a perspective view after a holder assembly slides a head mount wearable device according to various embodiments of the disclosure.

FIG. 7A is a perspective view after a holder assembly of a head mount wearable device according to various embodiments slides.

Figure 7B:
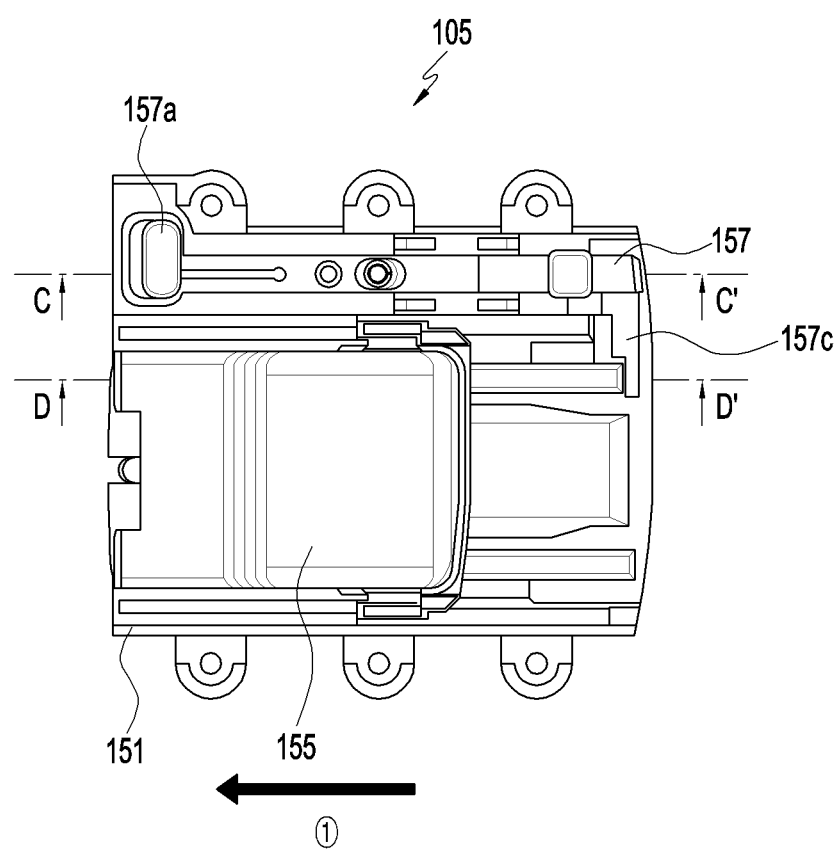
FIG. 7B is a front view after a holder assembly slides in a head mount wearable device according to various embodiments of the disclosure.

FIG. 7B is a front view after a holder assembly slides in a head mount wearable device according to various embodiments.

Figure 7C:
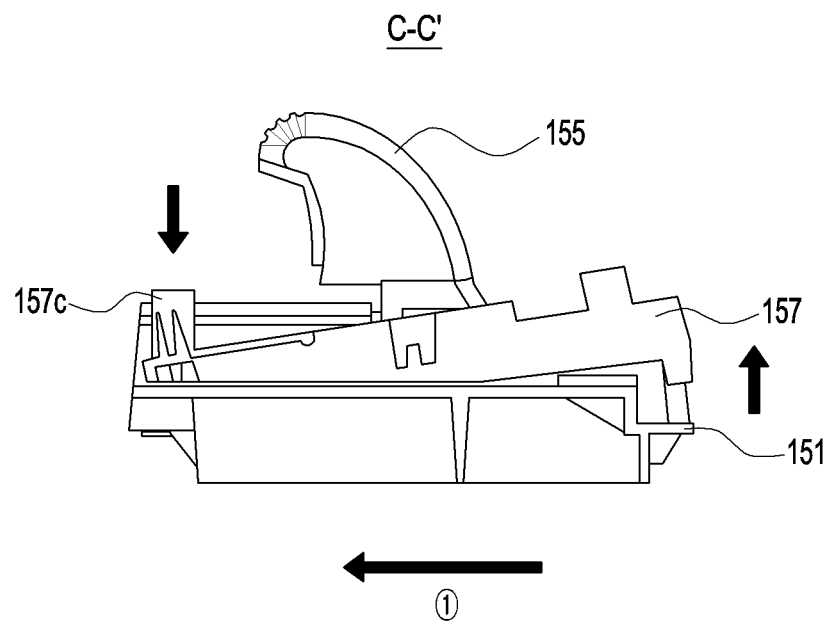
FIG. 7C is a cross-sectional view taken along line C-C' of FIG. 7B according to various embodiments of the disclosure.

FIG. 7C is a cross-sectional view taken along line C-C' of FIG. 7B according to various embodiments.

Figure 7D:
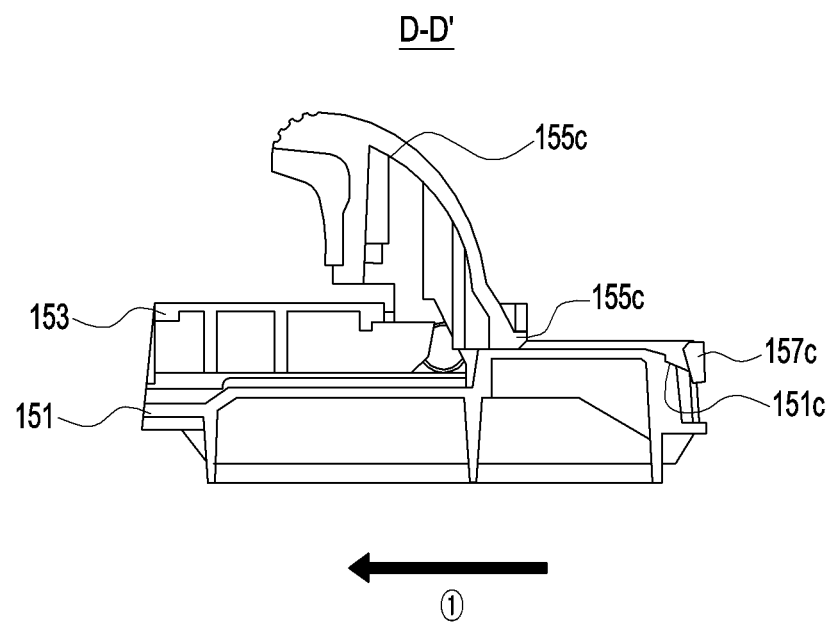
FIG. 7D is a cross-sectional view taken along line D-D' of FIG. 7B according to various embodiments of the disclosure.

FIG. 7D is a cross-sectional view taken along line D-D' of FIG. 7B according to various embodiments.

Referring to FIGS. 7A to 7D, when the protrusion 157c of the button 157 is pressed down, the button 157 can be rotated about the second shaft (e.g., the second shaft 157b of FIG. 4). As the button 157 is rotated, the other end 157c of the button 157 can lift the second locking portion 155c. For example, the second locking portion 155c can be moved in the opposite direction to the button 157 pressed down. As the second locking portion 155c is moved, it can be unlocked from the first locking portion1 151c. As the second locking portion 155c and the first locking portion 151c are unlocked from each other, the first member 153 can be moved in the first direction ① by the elasticity of the first biasing member 152.

Figure 8:
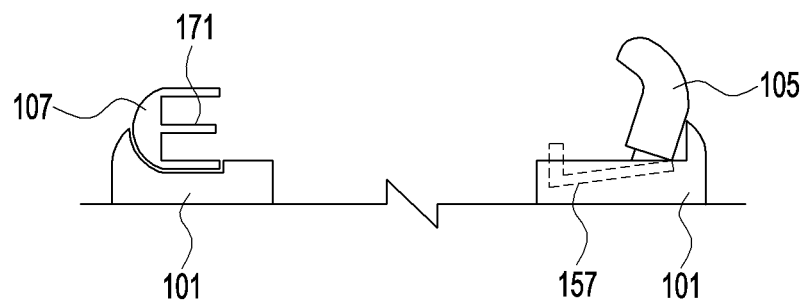
FIG. 8 is a schematic view before a mobile device is mounted on a head mount wearable device according to various embodiments of the disclosure.

FIG. 8 is a schematic view before a mobile device is mounted on a head mount wearable device according to various embodiments of the disclosure.

Figure 9:
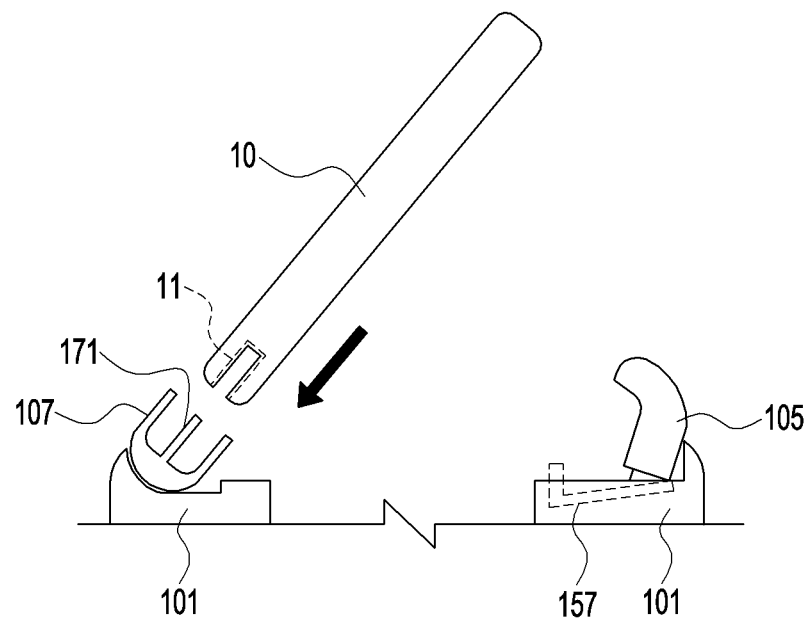
FIG. 9 is a schematic view when a connector of a mobile device is coupled to a connector assembly of a head mount wearable device according to various embodiments of the disclosure.

FIG. 9 is a schematic view when a connector assembly of a head mount wearable device according to various embodiments.

Referring to FIGS. 8 and 9, the connector assembly 107 may include an electrical connector 171 that is connected to the connector 11 of the mobile device 10. The connector assembly 107 can be rotated on the housing 101 such that the electrical connector 171 is inclined with respect to the housing 101. The mobile device 10 can be inserted toward the connector assembly 107 at an angle with respect to the housing 101. For example, the other portion of the mobile device 10 may be covered by the connector assembly 107. The electrical connector 171 can be electrically connected to the connector 11 of the mobile device 10 by being inserted therein.

FIG. 10 is a schematic view when a mobile device is mounted in a space of a head mount wearable device according to various embodiments of the disclosure.

Figure 11:
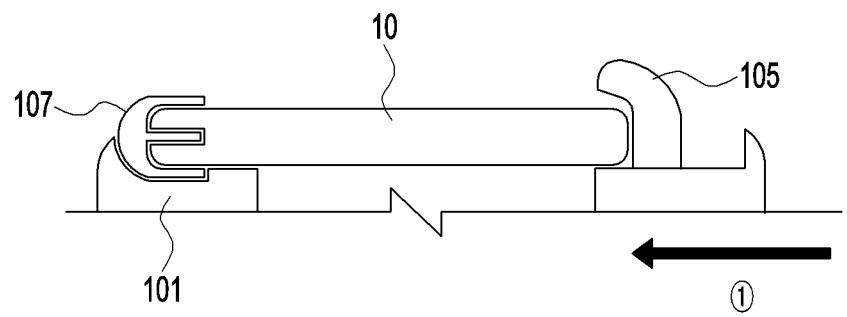
FIG. 11 is a cross-sectional view when a portion of a mobile device is covered by a holder assembly of a head mount wearable device according to various embodiments of the disclosure.

Referring to FIGS. 10 and 11, the mobile device 10 can be connected to the connector assembly 107 and rotated with the connector assembly 107. The mobile device 10 can be received into the space 115 by rotating. The display 12 of the mobile device 10 may be positioned to fact a pair of lenses (e.g., the pair of lenses 102 of FIG. 1). The mobile device 10 can press down the button 157 when being received into the space 115.

FIG. 11 is a cross-sectional view when a holder assembly of a head mount wearable device according to various embodiments.

Referring to FIG. 11, when the button (e.g., the button 157 of FIG. 10) is pressed down by the mobile device 10, the holder assembly 105 can be moved in the first direction ①. As the holder assembly 105 is moved in the first direction ①, the holder assembly 105 can cover a portion of the mobile device 10. The mobile device 10 can be kept on the wearable device 100 by being partially covered by the connector assembly 107 and the holder assembly 105.

Figure 12:
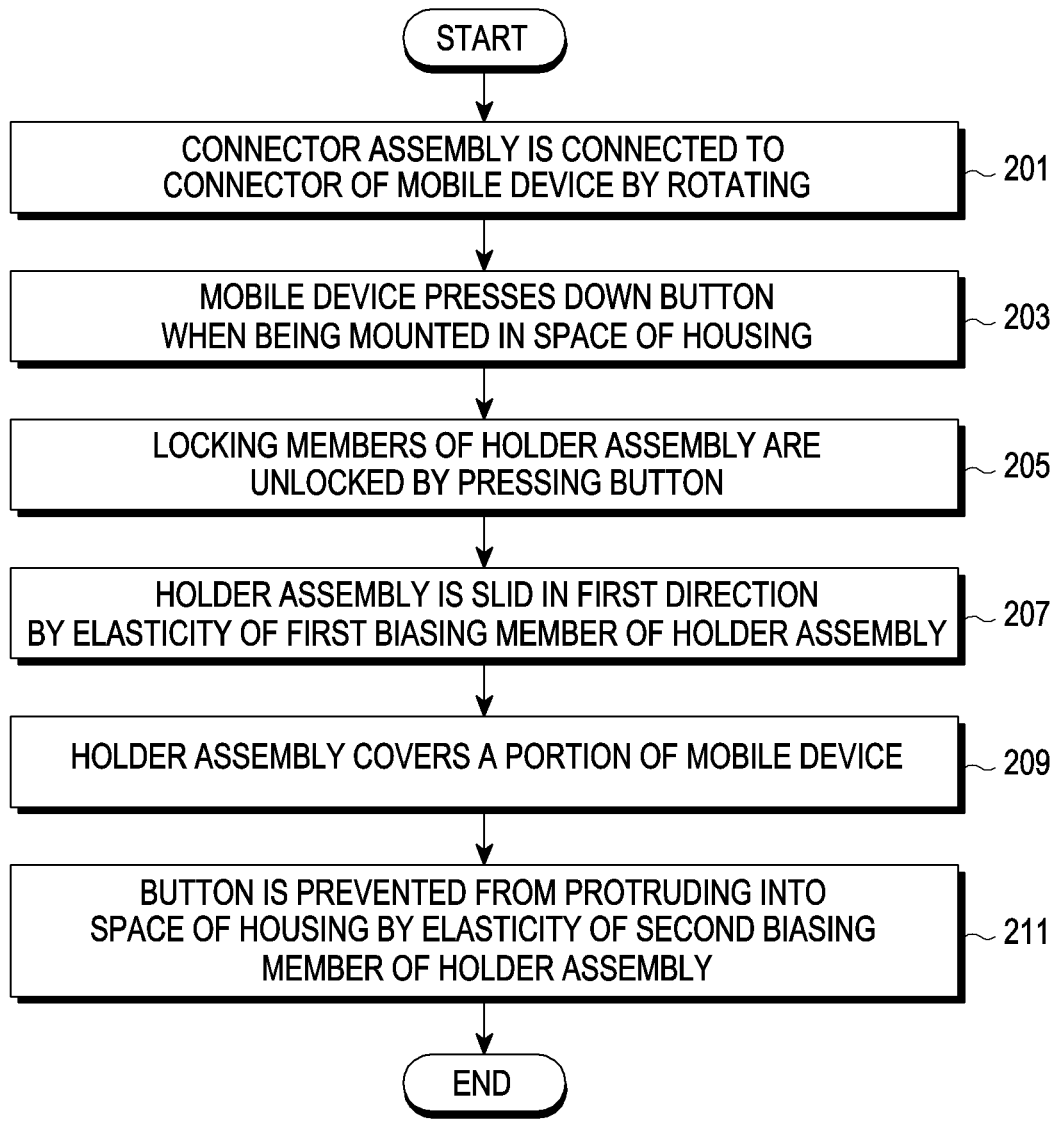
FIG. 12 is a flowchart illustrating a method of operating a head mount wearable device according to various embodiments of the disclosure.

FIG. 12 is a flowchart illustrating a method of operating a head mount wearable device according to various embodiments of the disclosure.

Referring to FIG. 12, in operation 201, the connector assembly (e.g., the connector assembly 107 of FIG. 9) can be connected to the connector (e.g., the connector 11 of FIG. 9) of the mobile device (e.g., the mobile device 10 of FIG. 9) by being rotated (201).

According to an embodiment of the disclosure, in operation 203, when the mobile device 10 is mounted into the space (e.g., the space 115 of FIG. 1) of the housing 101, the mobile device 10 can press down the button 157 (203).

According to an embodiment of the disclosure, in operation 205, as the button 157 is pressed down, the locking members (e.g., the locking members 151c and 155c of FIG. 7) of the holder assembly (e.g., the holder assembly 105 of FIG. 7A) can be unlocked from each other (205).

According to an embodiment of the disclosure, in operation 207, the holder assembly 105 can be slid in the first direction ① by the elasticity of the first biasing member (e.g., the first biasing member 282 of FIG. 6) of the holder assembly 105 (207).

According to an embodiment of the disclosure, in operation 209, the holder assembly 105 can cover a portion of the mobile device 10 (209).

According to an embodiment of the disclosure, in operation 211, the button 157 can be prevented from protruding into the space 115 of the housing 101 by the elasticity of the second biasing member (e.g., the second biasing member 158 of FIG. 10) of the holder assembly 105 (211).

As described above, a head mount wearable device according to various embodiments (e.g., the head mount wearable device 100 of FIG. 1) includes a housing (e.g., the first housing 101 of FIG. 1) having a first surface and a second surface, in which the first surface faces the face of a user and the second surface is opposite to the first surface when a user wears the head mount wearable device 100, a pair of lenses (e.g., the pair of lenses 102 of FIG. 1) disposed inside at least one opening (e.g., the opening 113 of FIG. 1) formed through the housing 101 from the first surface to the second surface, at least one mounting member (e.g., the first mounting member 119 of FIG. 1) connected to the housing 101 and configured to be worn by a user such that the pair of lenses 102 are positioned in front of the eyes of a user, and a holder assembly (e.g., the holder assembly 105 of FIG. 1) formed on the second surface or close to the second surface to hold a mobile device (e.g., the mobile device 10 of FIG. 12) including a display (e.g., the display 12 of FIG. 12) and holding the mobile device 10 such that the display 12 of the mobile device 10 faces the opening 113. The holder assembly 105 is positioned not to close the opening 113 and may include a mechanical button (e.g., the button 157 of FIG. 2) disposed on the second surface to be pressed down when the mobile device 10 is held by the holder assembly 105, a first member (e.g., the first member 153 of FIG. 2) sliding on the second surface in a first direction (e.g., the first direction ① of FIG. 7) from a first position to a second position in which the first position is closer to the opening 113 than the second position when seen from above the second surface a second member (e.g., the second member 155 of FIG. 2) connected to the first member 153, being able to rotate about a shaft (e.g., the shaft 155a of FIG. 2) extending in a second direction perpendicular to the first direction ①, and forming a recess (e.g., a recess 155r of FIG. 2) in cooperation with the first member 153 to receive a portion of the mobile device 10, and a first biasing member (e.g., the first biasing member 152 of FIG. 2) moving the first member 153 in the first direction ① when the button 157 is pressed down, and configured such that the second member 155 is close to the second surface.

According to an embodiment of the disclosure, the first biasing member (e.g., the first biasing member 152 of FIG. 2) may include a spring extending in the first direction.

According to an embodiment of the disclosure, the holder assembly (e.g., the holder assembly 105 of FIG. 2) may further include a second biasing member (e.g., the second biasing member 158 of FIG. 2) configured to release the first member (e.g., the first member 153 of FIG. 2) such that the first member 153 is moved in the first direction ① when the button (e.g., the button 157 of FIG. 2) is pressed down.

According to an embodiment of the disclosure, the second biasing member (e.g., the second biasing member 158 of FIG. 2) may extend in a third direction perpendicular to the second surface.

According to an embodiment of the disclosure, the head mount wearable device (e.g., the head mount wearable device 100 of FIG. 1) may further include a connector assembly (e.g., the connector assembly 107 of FIG. 1) disposed on or close to the second surface in an opposite area to the holder assembly (e.g., the holder assembly 105 of FIG. 1) across the opening (e.g., the opening 113 of FIG. 1). The connector assembly 107 may include an electrical connector (e.g., the connector 171 of FIG. 10) that is connected to a connector (e.g., the connector 11 of FIG. 10) of the mobile device (e.g., the mobile device 10 of FIG. 10) when the mobile device 10 is mounted on the wearable device (e.g., the wearable device 100 of FIG. 1).

According to various embodiments of the disclosure, a head mount wearable device (e.g., the heat mount wearable device 100 of FIG. 1) may include a housing (e.g., the housing 101 of FIG. 1) having a space (e.g., the space 115 of FIG. 1) in which at least one lens (e.g., the pair of lenses 102 of FIG. 1) is disposed and a mobile device (e.g., the mobile device 10 of FIG. 10) is mounted, a connector assembly (e.g., the connector assembly 107 of FIG. 1) rotatably connected to the housing 101 and electrically connected to the mobile device 10, and a holder assembly (e.g., the holder assembly 105 of FIG. 1) included in the housing 101 and sliding when a button (e.g., the button 157 of FIG. 2) on the housing 101 is pressed down, to cover a portion of the mobile device 10. The holder assembly 105 may include a body (e.g., the body 151 of FIG. 2) combined with the housing 101, a first member (e.g., the first member 153 of FIG. 2) sliding on the body 151, a first biasing member (e.g., the first biasing member 152) disposed between the body 151 and the first member 153 and providing elasticity to the first member 153, a second member (e.g., the second member 155 of FIG. 2) rotatably connected to the first member 153 to cover a portion of the mobile device 10, locking members (e.g., the locking members 151c and 155c of FIG. 6D) locking or unlocking the second member 155 to or from the body 151, a button (e.g., the button 157 of FIG. 2) unlocking the locking members 151c and 155c by being pressed and rotated by the mobile device 10, and a second biasing member (e.g., the second biasing member 158) preventing the button 157 from protruding out of the housing 101.

According to an embodiment of the disclosure, the connector assembly (e.g., the connector assembly 107 of FIG. 1) may cover another portion of the mobile device (e.g., the mobile device 10 of FIG. 10).

According to an embodiment of the disclosure, the first biasing member (e.g., the first biasing member 152 of FIG. 2) can slide the first member (e.g., the first member 153 of FIG. 2) on the body (e.g., the body 151 of FIG. 2) by providing elasticity to the first member 153.

According to an embodiment of the disclosure, the button (e.g., the button 157 of FIG. 2) may have a second shaft (e.g., the second shaft 157b of FIG. 4) extending in a second direction perpendicular to the first direction in which the first member (e.g., the first member 153 of FIG. 2) extends, and a lever (e.g., the lever 157c of FIG. 4) unlocking the locking members (e.g., the locking members 151c and 155c) by lifting the second member (e.g., the second member 155 of FIG. 2) when the second shaft 157b is rotated.

According to an embodiment of the disclosure, the locking members (e.g., the locking members 151c and 155c) may have a first locking portion (e.g., the first locking portion 151c of FIG. 6D) formed at the body 151 and a second locking portion (e.g., the second locking portion 155c of FIG. 6D) formed at the second member 155 to be locked to or unlocked from the first locking portion 151c.

According to an embodiment of the disclosure, when the button 157 is pressed down by the mobile device 10, the lever 157 is rotated about the second shaft 157b and moves the second locking portion 155c in a third direction perpendicular to the first direction and the second direction, and the second locking portion 155c can be unlocked from the first locking portion 151c as it is moved in the third direction.

According to an embodiment of the disclosure, the second biasing member 158 is disposed between the housing 101 and the lever 157c and can provide elasticity to the lever 157c of the button 157 in the third direction perpendicular to the first direction.

According to an embodiment of the disclosure, as the lever 157c is pressed down by the second locking portion 155c, the lever 157c contracts the second biasing member 158. Further, as the second locking portion 155c is unlocked from the first locking portion 151c, the second biasing member 158 can press the button 157 in the opposite direction to the third direction.

According to an embodiment of the disclosure, as the second locking portion 155c is unlocked from the first locking portion 151c, the first biasing member 152 can pull the first member 153 in the first direction such that the first member 153 covers a portion of the mobile device 10.

According to an embodiment of the disclosure, the second member 155 can be rotated about the shaft (e.g., the shaft 155a of FIG. 5) extending in the second direction.

According to an embodiment of the disclosure, the first locking portion 151c may be formed in a groove shape and the second locking portion 155c may protrude to correspond to the groove shape of the first locking portion 151c.

According to an embodiment of the disclosure, the second member 155 is moved with the first member 153 by an external force applied in the opposite direction to the first direction, whereby the second member 155 can be separated from a portion of the mobile device 10.

According to an embodiment of the disclosure, as the second member 155 is rotated about the first member 153 by an external force, the second locking portion 155c of the second member 155 can be locked to the first locking portion 151c.

According to an embodiment of the disclosure, as the second locking portion 155c presses the button 157 while being locked to the first locking portion 151c, the button 157 can be rotated about the second shaft 157c. According to various embodiments of the disclosure, the holder assembly (e.g., the holder assembly 105 of FIG. 1) of a head mount wearable device (e.g., the head mount wearable device 100 of FIG. 1) may include a mechanical button (e.g., the button 157 of FIG. 2), a first member (e.g., the first member 153 of FIG. 2) sliding on a surface of the head mount wearable device 100 in a first direction from a first position to a second position, in which the first position is closer to the opening (e.g., the opening 113 of FIG. 1) than the second position when seen from above the first surface, a second member (e.g., the second member 155 of FIG. 2) connected to the first member 153, being rotatable about a shaft (e.g., the shaft 155a of FIG. 2) extending in a second direction perpendicular to the first direction, and forming a recess (e.g., the recess 155r of FIG. 2) in cooperation with the first member 153 to receive a portion of the mobile device (e.g., the mobile device 10 of FIG. 10), and a first biasing member (e.g., the first biasing member 152) moving the first member 153 in the first direction when the button 157 is pressed down, and configured such that the second member 155 is close to the second surface.

According to various embodiments of the disclosure, a head mount wearable device (e.g., the heat mount wearable device 100 of FIG. 1) may include a housing (e.g., the housing 101 of FIG. 1) having a space (e.g., the space 115 of FIG. 1) in which at least one lens (e.g., the pair of lenses 102 of FIG. 1) is disposed and a mobile device (e.g., the mobile device 10 of FIG. 1) is mounted, a connector assembly (e.g., the connector assembly 107 of FIG. 1) rotatably connected to the housing 101 and electrically connected to the mobile device 10, and a holder assembly (e.g., the holder assembly 105 of FIG. 1) sliding when a button 157 on the housing 101 is pressed down, to cover a portion of the mobile device 10.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A head mount wearable device comprising:
a housing including a first surface and a second surface, wherein the first surface faces the face of a user and the second surface is opposite to the first surface when a user wears the head mount wearable device;
a pair of lenses positioned in at least one opening formed through the housing from the first surface to the second surface;
at least one mounting member connected to the housing and configured to be worn by a user while the pair of lenses are configured to be positioned in front of eyes of the user; and
a holder assembly formed on the second surface or close to the second surface to hold a mobile device including a display and holding the mobile device such that the display of the mobile device faces the opening,
wherein the holder assembly is positioned not to close the opening and includes:
a first member sliding on the second surface in a first direction from a first position to a second position in which the first position is closer to the opening than the second position when seen from above the second surface,
a mechanical button positioned on the second surface, and to be rotatably pressed down about a first shaft extending in a second direction perpendicular to the first direction when the mobile device is held by the holder assembly,
a second member connected to the first member, being able to rotate about a second shaft disposed parallel to the first shaft, and forming a recess in cooperation with the first member to receive a portion of the mobile device, and a first biasing member moving the first member in the first direction when the button is pressed down, and configured where the second member is close to the second surface.

2. The head mount wearable device of claim 1, wherein the first biasing member includes a spring extending in the first direction.

3. The head mount wearable device of claim 1, wherein the holder assembly further includes a second biasing member configured to release the first member where the first member is moved in the first direction when the button is pressed down.

4. The head mount wearable device of claim 3, wherein the second biasing member extends in a third direction perpendicular to the second surface.

5. The head mount wearable device of claim 1, further comprising:

a connector assembly disposed on or close to the second surface, in an area opposite to the holder assembly across the opening.

6. A head mount wearable device comprising:

a housing having a space in which at least one lens is disposed and a mobile device is mounted;

a connector assembly rotatably connected to the housing and electrically connected to the mobile device; and a holder assembly included in the housing and configured to slide when a button on the housing is pressed down, to cover a portion of the mobile device, wherein the holder assembly includes:

a body combined with the housing, a first member configured to slide on the body, a first biasing member disposed between the body and the first member and providing elasticity to the first member, a second member rotatably connected to the first member to cover a portion of the mobile device, locking members configured to lock or unlock the second member to or from the body, a button configured to unlock the locking members by being pressed and rotated by the mobile device, and a second biasing member configured to prevent the button from protruding out of the housing.

7. The head mount wearable device of claim 6, wherein the connector assembly covers a portion of the mobile device.

8. The head mount wearable device of claim 6, wherein the first biasing member slides the first member on the body by providing elasticity to the first member.

9. The head mount wearable device of claim 6, wherein the button comprises:

a first shaft extending in a second direction perpendicular to a first direction in which the first member slides; and a lever configured to unlock the locking members by lifting the second member by rotating about a second shaft.

10. The head mount wearable device of claim 9, wherein the locking members include a first locking portion formed at the body and a second locking portion formed at the second member to be locked to or unlocked from the first locking portion.

11. The head mount wearable device of claim 10, wherein, when the button is pressed down by the mobile device, the lever is rotated about the second shaft and moves the second locking portion in a third direction perpendicular to the first direction and the second direction, and the second locking portion is unlocked from the first locking portion as it is moved in the third direction.

12. The head mount wearable device of claim 10, wherein the second biasing member is disposed between the housing and the lever and provides elasticity to the lever of the button in a third direction perpendicular to the first direction.

13. The head mount wearable device of claim 10, wherein, when the lever is pressed down by the second locking portion, the lever contracts the second biasing member, and wherein, when the second locking portion is unlocked from the first locking portion, the second biasing member presses the button in the opposite direction to a third direction.

14. The head mount wearable device of claim 10, wherein, when the second locking portion is unlocked from the first locking portion, the first biasing member pulls the first member in the first direction where the first member covers a portion of the mobile device.

15. The head mount wearable device of claim 10, wherein the second member can rotate about a shaft extending in the second direction.

16. The head mount wearable device of claim 10, wherein the first locking portion is formed in a groove shape and the second locking portion protrudes to correspond to the groove shape of the first locking portion.

17. The head mount wearable device of claim 10, wherein, when the second member is moved with the first member by an external force applied in the opposite direction to the first direction, the second member is separated from a portion of the mobile device.

18. The head mount wearable device of claim 17, wherein, when the second member is rotated about the first member by an external force, the second locking portion of the second member is locked to the first locking portion.

19. The head mount wearable device of claim 18, wherein, when the second locking portion presses the button while being locked to the first locking portion, the button is rotated about the second shaft.

* * * * *